2,776,872

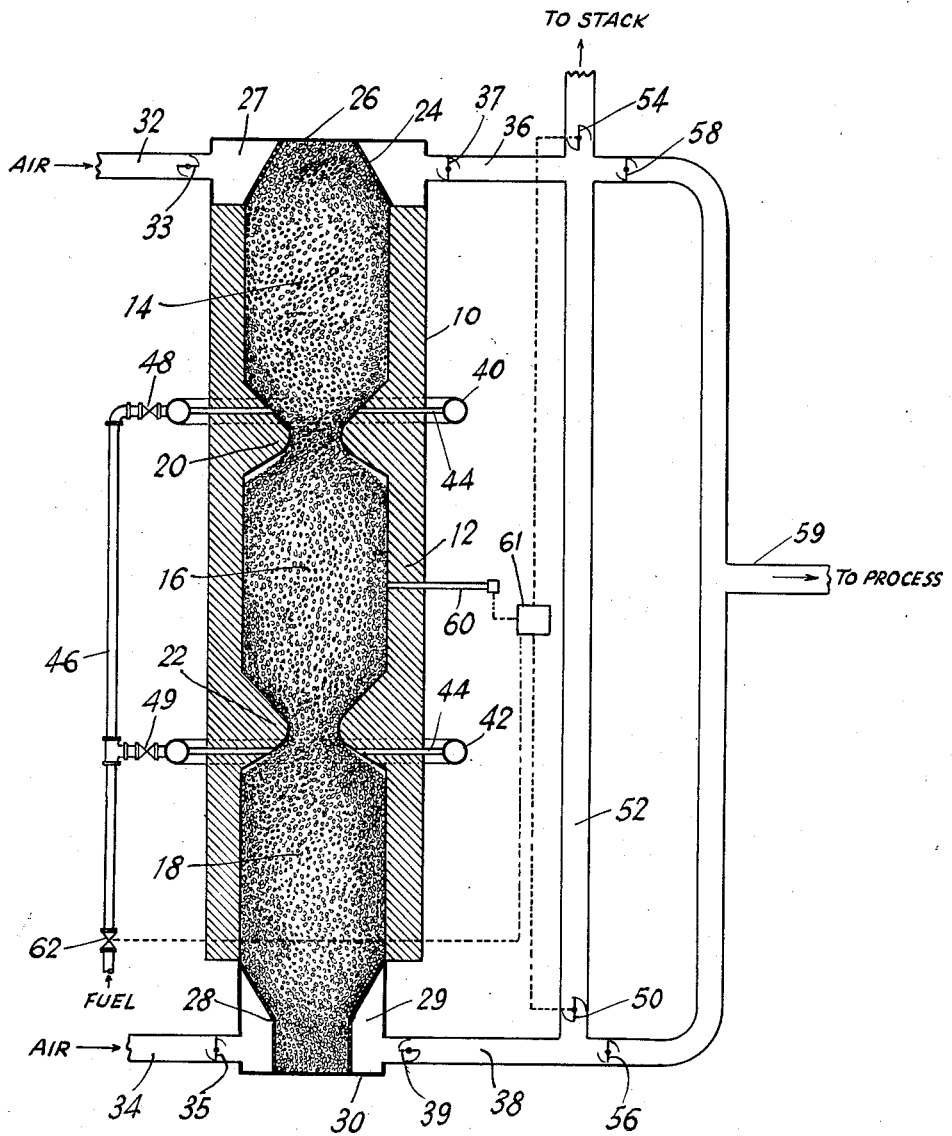

APPARATUS SUITABLE FOR THE FIXATION OF NITROGEN

Charles L. Norton, Jr., New York, N. Y., assignor to The Babcock & Wilcox Company, New York, N. Y., a corporation of New Jersey Original application May 24, 1946, Serial No. 672,115. Divided and this application April 9, 1953, Serial No. 347,680

3 Claims. (Cl. 23—277)

This invention relates in general to apparatus suitable for the fixation of nitrogen. More particularly, it relates to apparatus for the production of nitrogen compounds from atmospheric nitrogen at high temperatures and relatively low pressures in stationary bed heaters. This application is a division of my pending application Serial No. 672,115, filed May 24, 1946, now abandoned.

In spite of the fact that there has been a great deal of investigation on the fixation of atmospheric nitrogen at high temperatures, no commercially operable process other than the electric arc process has heretofore been developed. This process is based upon the fact that the nitrogen in the air tends to combine with the oxygen present to form nitric oxide (NO) at temperatures above 1800° C. (3272° F.) with the nitric oxide yield increasing with increasing reaction temperatures. The reaction formula is $N_2+O_2 \rightleftarrows 2NO$. This process, however, is rapidly losing out to the calciumcyanide and synthetic ammonia process in view of its unfavorably high investment cost per ton of product, the need to locate such plants in places where electric power is plentiful, and the inherent low thermal efficiency of the process.

A main object of my invention is the provision of apparatus for carrying out the thermal fixation of atmospheric nitrogen which is characterized by its simple and low cost construction, location of all control valves in low temperature locations, adaptability for automatic control, and high thermal efficiency.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which a preferred embodiment of the invention is illustrated and described.

In the normal operation of the apparatus of my invention, air under a low positive pressure (2–10 p. s. i.) is preheated to a relatively high temperature by its passage through a gas-pervious stationary mass of suitable high temperature refractory material, mixed with a suitable liquid or gaseous fuel, and the combustible mixture burned to heat a further gas-pervious stationary mass of high temperature refractory material in a reaction zone to a high temperature approximating the minimum reaction temperature. The combustion products or heating gases on leaving the reaction zone are passed through a second air preheating zone containing a further gas-pervious stationary mass of high temperature refractory material which absorbs sufficient heat from the heating gases to lower their temperature to a thermally efficient value and to heat the refractory material to a predetermined temperature before the gases discharge to a stack. After a predetermined time interval, the air flow is reversed and preheated in the second preheating zone, while the fuel is introduced adjacent the opposite end of the reaction zone. The refractory material in the reaction zone is thus further heated to a still higher temperature and the discharging combustion products pass through the first air preheating zone, heating the refractory material therein and cooling the gases to a low temperature before discharge to the stack. This reversing cycle is repeated until the refractory material in the reaction zone is at a temperature, e. g. 4500° F., substantially above the minimum reaction temperature, the maximum temperature maintained depending primarily upon the permissible use temperature of the material forming the structure and the refractory material within the reaction zone. The introduction of fuel is automatically stopped when the desired reaction zone temperature is attained. The introduction of air under pressure is continued, however, in a reversing cycle, with the air preheated in one preheating zone, further heated to a nitrogen fixation reaction temperature in the reaction zone, the reaction products rapidly quenched in the other preheating zone, and the quenched gaseous products delivered to a point where the nitric oxide constituent can be separated and collected. The introduction of air alone in the reversing cycle is continued until the temperature in the reaction zone drops to a value, e. g. 4000° F., at which the nitric oxide yield is relatively low, at which temperature value the fuel introduction is automatically restored and the initially described operation repeated.

In the accompanying drawing is illustrated a somewhat diagrammatic elevation, partly in section, of a preferred form of apparatus embodying the invention.

While the invention in its broader aspects is applicable to many types of gaseous reactions which can be carried out at extremely high temperatures, the apparatus illustrated is particularly designed and especially useful for the fixation of atmospheric nitrogen.

In accordance with the present invention, as illustrated by the drawings, the nitrogen fixation reaction is preferably carried out in a vertically positioned, stationary refractory bed type heater having a substantially cylindrical fluid tight casing 10 lined with an annular wall of suitable high temperature refractory material 12. The heater is divided into three (3) superimposed connected chambers 14, 16 and 18 by annular internally projecting rounded refractory areas 20 and 22 of tapering cross-section forming restricted openings substantially circular in cross section between chambers 14 and 16 and 16 and 18. The upper end portion of chamber 14 is formed by a frusto-conical screen 24 closed at its smaller or upper end by a fluid-tight plate 26. The annular space 27 between the screen 24, casing 10 and the outer annular edge of plate 26 forms a chamber through which a gaseous medium can be either introduced or removed from chamber 14 through screen 24. An inverted frusto-conical screen 28 terminating in a lower cylindrical portion forms the lower end portion of the chamber 18. A fluid-tight cover plate 30 forms the lower end of the casing 10 and closes the bottom of the chamber. The annular space 29 between the screen 28, casing 10 and the outer annular edge of cover plate 30 forms a chamber through which a gaseous medium can be introduced or removed from chamber 18 depending on the desired direction of flow. The chambers 14, 16 and 18 are filled with a continuous column of refractory material of a refractoriness capable of withstanding the maximum temperatures maintained in normal operation in the reaction zone without fusing or disintegrating, and of a size and formation rendering the column gas-pervious.

Each of the chambers 27 and 29 is provided with means for introducing or withdrawing a gaseous medium into or from the corresponding annular space. In the illustrated embodiment of the apparatus, these consist of supply conduits 32 and 34 through which air can be introduced into the annular chamber and conduits 36 and 38 through which gaseous products can be withdrawn. Each of the four conduits, 32, 34, 36 and 38, is provided with a damper 33, 35, 37 and 39 respectively, to regulate the flow of gases therethrough. The controls for these dampers are interconnected so that they operate in pairs in an alternate manner. For example, as is shown in the drawings, the dampers 33 and 39 operate in conjunction with one another and are open so that air supplied through the conduit 32 to the annular chamber 27 can pass through screen 24 down through the openings or interstices in the mass or column of refractory material 11 and out through the screen 28 at the bottom of chamber 18 into annular chamber 29, past damper 39 and through conduit 38, whereas both dampers 35 and 37 are in closed position preventing any of the gaseous material in the annular chambers 27 or 29 from flowing out through conduits 34 and 36. On the other hand, when dampers 33 and 39 are closed, dampers 35 and 37 are opened, so that air supplied through conduit 34 would enter chamber 29, pass through screen 28 into the bed of refractory material in chamber 18, flow upwardly therethrough between the interstices in the bed of refractory material, through chambers 16 and 14 and out through screen 24 into annular chamber 27, past damper 37 into discharge conduit 36.

The heater is further provided with two annular headers 40 and 42 through which a liquid or gaseous fuel is introduced into the heater through radial inlet pipes 44 into the end chambers 14 and 18 at a point close to the circular restricted openings between these chambers and the center chamber 16. Fuel is supplied to headers 40 and 42 through fuel supply pipe 46 and solenoid controlled valves 48 and 49 which are provided with suitable automatic timer means (not shown) to alternately introduce fuel into the heater at regulated time intervals. A solenoid controlled valve 62 also located in pipe 46 is arranged to cut off the flow of fuel in the pipe 46 in response to a predetermined change in a temperature measuring element 60 positioned in the center chamber 16.

When the described apparatus is used for the fixation of nitrogen, the heat energy, as represented by temperature, is built up in chamber 16 to an exceedingly high degree by causing hot burning gases to pass through the chamber from either end alternately. This is accomplished by first closing dampers 35 and 37 and supplying air to the refractory column through conduit 32, annular chamber 27 and screen 24 while simultaneously supplying fuel in the form of a gas or vapor from fuel pipe 46 through header 40 and radial burners 44. As the air passes downwardly through the interstices in the refractory bed in chamber 14 it mixes with and is caused to support the combustion of the fuel as they meet and pass through the restricted venturi-like opening where the gases are thoroughly mixed before passing into chamber 16 where the combustion products start giving up their heat energy to the refractory particles with which they come into contact. By the time these gases pass down through chamber 16 and the upper portion of chamber 18 they have given up most of their heat energy and consequently reach annular chamber 29 through screen 28 in a fairly cold state. From there the gases pass open damper 39, enter pipe 38, pass open damper 50, through pipe 52, by the open damper 54, and up to the stack.

After a definite time interval which may, for example, consist of 2–3 minutes, dampers 33 and 39 and fuel valve 48 close, while dampers 35 and 37 and valve 49 open, permitting a flow of combustion air and heating gases through the heater in the reverse direction. The air entering chamber 29 through supply pipe 34 will flow upwardly through screen 28 into chamber 18 where it comes into intimate heat transfer contact with the refractory material therein, thereby becoming preheated before it reaches the radial burners in the top of chamber 18 through which the fuel is supplied. Since any increase in the temperature of the combustion air is directly reflected within limits in the flame temperature of a specified fuel, the temperature of the combustion gases entering the bottom of chamber 16 will be proportionately higher than the temperature of the combustion gases entering the chamber from the other direction during the last previous cycle. As these gases pass upwardly through chambers 16 and 14 in intimate heating contact with the refractory particles, they give up their heat energy to the refractory particles with which they come into contact in such manner that the refractory particles in the center chamber are the maximum temperature and the refractory particles in chamber 14 gradually decrease in temperature from the inner end to the outer end at which the relatively cool gases leave through screen 24 and enter annular chamber 27, pass open damper 37, through discharge pipe 36, pass open damper 54 and proceed to the stack. After the elapse of the predetermined 2–3 minute interval, dampers 35 and 37 and valve 49 are closed, and dampers 33 and 39 and valve 48 are opened to cause the gases to again flow through the heater in the reverse direction.

The combustion gases are caused to flow through the heater in alternate directions at 2–3 minute time cycles in the above described manner until the temperature in the center chamber has reached a predetermined value, such as 4500° F. and above. When the temperature has reached this level, the temperature measuring element 60 which is arranged to measure temperatures of the above order in chamber 16 activates temperature responsive element 61 which in turn automatically closes valve 62 in the feed line, thereby preventing any additional fuel from reaching either distributor header 40 or 42. The temperature responsive element 61 also simultaneously acts to close dampers 50 and 54 while opening dampers 56 and 58. This closes the stack connections from discharge pipes 36 and 38 and opens the conduits leading to a conduit 59, which in turn is connected to suitable means (not shown) for separating and collecting any nitric oxide present in the gases.

Dampers 33, 35, 37 and 39 continue to function in accordance with the same time cycles as previously indicated, thus causing air to pass through the heater in alternate directions with a time cycle of 2–3 minutes. As the air enters the heater at either end it comes into intimate heat contact with the refractory particles in the end chambers and becomes preheated before entering chamber 16. The air reaches a temperature above 4000° F. in the chamber 16 and the nitrogen and oxygen in the gaseous mixture tend to react to form nitric oxide as described. Since this reaction is easily reversable at high temperatures, it is important that the temperature of the reaction products be reduced rapidly to insure a substantial yield of NO. The two refractory filled chambers 14 and 18 are well adapted for this purpose. As the gases leave chamber 16 and pass through the end chambers 14 or 18 as the case may be, the gases rapidly give up their heat energy to the refractory particles with which they come into contact in their passage therethrough and leave the column in a relatively cool state.

The heat energy given up to the refractory particles is not wasted, however, since the end chambers 14 and 18 serve a double function, depending upon direction of gas flow through the heater. For during the next cycle, when the gases flow in the reverse direction, the cold air entering the other end of the column will come into intimate contacts with refractory particles and absorb heat energy from them and become preheated before reaching the hot center portion of the column where the reaction will take place.

After the temperature in the center chamber 16 has dropped to approximately 4000° F. as a result of loss of heat energy due to the nitrogen fixation reaction as well as other heat losses, the temperature measuring element 60 activates temperature responsive element 61 which will again close dampers 56 and 58, open dampers 50 and 54 leading to the stack, and open valve 62 permitting fuel to again reach the annular header 40 or 42. As the fuel enters the furnace through the respective headers at the appropriate time intervals, it will burn in the presence of the air and again heat the refractory particles in the center portion of the column until the temperature in chamber 16 again reaches a point above 4500° F. When the temperature reaches this point the temperature measuring element 60 in conjunction with element 61 will again close valve 62 and dampers 50 and 54, and open dampers 56 and 58 in order that the gases having passed through the furnace during the following make period can reach the means provided for separating out the nitric oxide formed.

The above described apparatus can also be used advantageously for formation of HCN from a hydrocarbon and atmospheric nitrogen, for example, in accordance with the following equation:

$$2CH_4 + N_2 = 2HCN + 3H_2$$

The heater is brought up to temperature in much the same manner as previously described but a hydrocarbon fuel such as methane is used. After the temperature in chamber 16 has reached approximately 4500° F., the ratio of hydrocarbon flow to air flow is so adjusted that a definite excess of hydrocarbon is fed into the heater over and above the theoretical amount needed to use up all the oxygen in the air feed. This excess hydrocarbon in its passage through chamber 16 will react with the nitrogen present at the temperatures maintained therein to form HCN. As the products leave through either of the terminal chambers 14 or 18 they are rapidly cooled and led over to suitable apparatus for removing and collecting the HCN so formed. Since there is a continuous input of heat energy into the heater even during the endothermic reaction of forming HCN it is entirely possible to keep this reaction going continuously, without stopping to regenerate heat energy in chamber 16 of the heater. However, if the temperature in chamber 16 should for any reason drop below 4000° F., the ratio of fuel to air could be regulated so as to bring the temperature in chamber 16 back up to 4500° F. During all of this operation the air and reaction gas pass through the heater in the same alternate direction cycles as is the case when NO is being formed in accordance with the previously described method. Naturally, however, once the heater is being used to make HCN all the gases withdrawn from the terminal annular chambers 27 and 29 are collected and sent to a separator where the HCN is recovered.

Inasmuch as the temperatures in chamber 16 range between 4000° F. and 4500° F., it is advisable to use a refractory, such as MgO, which can withstand temperatures of this order as a lining for the chamber walls. This material is preferably also used to form the pellets constituting the gas-pervious column of material in the chambers. Since the temperatures in the heater are hottest in the center section and gradually taper off toward the ends, it is not essential that refractory of the type MgO be used to line the chambers of the whole heater. It is, however, preferable to line the entire center chamber 16 with this material. Other refractories which are serviceable at lower temperature ranges, such as $Al_2O_3$, can be used adjacent to the MgO and even these may be replaced by other cheaper refractory materials toward the ends of the chambers which is relatively cool even during periods of operation. Naturally, wherever MgO is used, it can in accordance with normal practice be backed up by other refractories.

As can readily be seen from the foregoing, the apparatus of this invention is extremely simple in structural design and has no moving parts in any hot area. It has a relatively low initial investment cost per ton of product as well as a very low maintenance requirement. Furthermore, since the terminal temperatures remain low during the complete cycle of operation, a high over-all thermal efficiency is obtained.

While the above description and the drawings submitted herewith disclose preferred and practical embodiment of my novel apparatus for fixing nitrogen, it will be understood by those skilled in the art that the specific details of apparatus described as well as the construction and arrangement of parts as shown and described, are by way of illustration and are not to be construed as limiting the scope of the invention.

What is claimed is:

1. In a fixed bed refractory type heater suitable for use in the fixation of atmospheric nitrogen, three superimposed chambers substantially filled with refractory particles, said chambers being in gaseous communication with one another through restricted openings therebetween, a pair of annular manifolds each circumferentially embracing the outer end of a different one of the end chambers and in gaseous communication with the outer end of the associated end chamber; gaseous material introduction conduit means and gaseous material withdrawal conduit means connected to each of said manifolds; control means associated with said conduit means for introducing gaseous material into one of said manifolds and withdrawing the gaseous material from the other manifold in cyclic alternation at regulated time intervals; gaseous fuel conduits connected in communication with said end chambers at points adjacent said restricted openings; a main fuel supply line connected to said fuel conduits; valve means associated with said fuel conduits and operable to admit the fuel alternately therethrough; and a heated gas collecting line connected to said manifolds.

2. In a fixed bed refractory type heater suitable for use in the fixation of atmospheric nitrogen, three superimposed chambers substantially filled with refractory particles, said chambers being in gaseous communication with one another through restricted openings therebetween, a pair of annular manifolds each circumferentially embracing the outer end of a different one of the end chambers and in gaseous communication with the outer end of the associated end chamber; gaseous material introduction conduit means and gaseous material withdrawal conduit means connected to each of said manifolds; control means associated with said conduit means for introducing gaseous material into one of said manifolds and withdrawing the gaseous material from the other manifold in cyclic alternation at regulated time intervals; gaseous fuel conduits connected in comunication with said end chambers at points adjacent said restricted openings; a main fuel supply line connected to said fuel conduits; valve means associated with said fuel conduits and operable to admit the fuel alternately therethrough; a valve in said main fuel line; temperature responsive means, responsive to the temperature in the intermediate chamber, opening said last-named valve when the intermediate chamber temperature is above a pre-set valve and closing said last-named valve at temperatures below said pre-set value; and a heated gas collecting line connected to said manifolds.

3. Apparatus as claimed in claim 2 in which said temperature responsive means closes said last-named valve when the temperature in the intermediate chamber reaches a point above 4500° F., and reopens said last-named valve when the temperature in said chamber has decreased to substantially 4000° F.

References Cited in the file of this patent

UNITED STATES PATENTS

| | | |
|---|---|---|
| 2,197,904 | Terry | Apr. 23, 1940 |
| 2,261,585 | Lockrae | Nov. 4, 1941 |
| 2,421,744 | Daniels et al. | June 10, 1947 |
| 2,512,259 | Pike | June 20, 1950 |
| 2,548,002 | Daniels | Apr. 10, 1951 |
| 2,582,016 | Dutcher | Jan. 8, 1952 |
| 2,642,338 | Pike | June 16, 1953 |
| 2,692,225 | Findlay | Oct. 19, 1954 |